US008983549B2

(12) United States Patent
Gonzalez et al.

(10) Patent No.: US 8,983,549 B2
(45) Date of Patent: Mar. 17, 2015

(54) METHOD OF ACQUISITION BY A MOBILE TERMINAL OF COMPLEMENTARY INFORMATION RELATED TO AT LEAST ONE POSTER PRESENT ON A DISPLAY PANEL

(76) Inventors: Jerome Gonzalez, Paris (FR); David Libault, Paris (FR); Jacques Lewiner, Saint-Cloud (FR)

( * ) Notice: Subject to any disclaimer, the term of this patent is extended or adjusted under 35 U.S.C. 154(b) by 198 days.

(21) Appl. No.: 13/638,721

(22) PCT Filed: Apr. 1, 2011

(86) PCT No.: PCT/FR2011/000196
§ 371 (c)(1),
(2), (4) Date: Oct. 1, 2012

(87) PCT Pub. No.: WO2011/121194
PCT Pub. Date: Oct. 6, 2011

(65) Prior Publication Data
US 2013/0029602 A1    Jan. 31, 2013

(30) Foreign Application Priority Data
Apr. 1, 2010   (FR) ..................................... 10 52451

(51) Int. Cl.
*H04M 1/00*     (2006.01)
*G06Q 30/02*    (2012.01)
*H04L 29/08*    (2006.01)
(52) U.S. Cl.
CPC ............... *G06Q 30/02* (2013.01); *H04L 67/18* (2013.01)
USPC ......... 455/566; 455/457; 455/456.1; 717/125

(58) Field of Classification Search
USPC ................ 455/566, 457, 456.1, 154.2, 158.4, 455/41.2; 717/125, 124
See application file for complete search history.

(56) References Cited

U.S. PATENT DOCUMENTS

| 6,549,625 | B1   | 4/2003  | Rautila et al. |
| 6,664,978 | B1 * | 12/2003 | Kekic et al. ................... 715/733 |
| 2002/0116268 | A1 | 8/2002 | Fukuda |
| 2004/0171378 | A1 * | 9/2004 | Rautila ......................... 455/419 |
| 2014/0086179 | A1 * | 3/2014 | Shi et al. ....................... 370/329 |

FOREIGN PATENT DOCUMENTS

EP    1 587 014 A1   10/2005
EP    2 026 275 A1   2/2009

OTHER PUBLICATIONS

International Search Report, dated Aug. 19, 2011, from corresponding PCT application.

* cited by examiner

*Primary Examiner* — Minh D Dao
(74) *Attorney, Agent, or Firm* — Young & Thompson

(57) ABSTRACT

A method of acquisition by a mobile terminal (20) situated in proximity to a display panel (10), of complementary information related to at least one poster (11) present on the display panel (10), the method including the following steps: acquisition of the identification data (S1) making it possible to identify the display panel (10), transmission of the identification data (S2) to a processing service by way of a communication network; and reception, from the processing service, of the complementary information relating to the poster (11) presented on the display panel (10) identified by the processing service on the basis of the identification data.

19 Claims, 2 Drawing Sheets

METHOD OF ACQUISITION BY A MOBILE TERMINAL OF COMPLEMENTARY INFORMATION RELATED TO AT LEAST ONE POSTER PRESENT ON A DISPLAY PANEL

BACKGROUND OF THE INVENTION

This invention relates to a method for acquiring, by a mobile terminal located in the vicinity of a display panel, additional information linked to at least one display present on the display panel.

Advertising display panels are communication media that make it possible to address a message to consumers passing in front of this medium. They are placed on the outside or on the inside and make it possible to present a product or a service to consumers.

This presentation of the product or services on the display panel can be performed by, for example, a paper or polymer display placed on the display panel that is optionally lit or backlit, or by a plasma or LCD screen or an electronic ink display.

The invention relates to a method and a device supplying a consultation service of additional information to a consumer located in front of a display panel that makes it possible for him to obtain additional information on the product or services presented on this panel quickly and simply.

Different methods or devices have been proposed to make possible such a service.

For example, on a display, a product is presented and also telephone numbers or addresses of distributors or of stores are indicated where it is possible to obtain them.

This very simple method is, however, not practical because the distributors or stores indicated can be located far from the display panel.

To eliminate this drawback, it has been proposed, for example, to add a banner indicating the stores or the nearby service providers, which, here again, is not very practical, not practical for the consumer but for the manager of the advertising panels who is forced to personalize each display as a function of the location where it is placed. Also, such a method exhibits the drawback of interfering with the esthetics of the display, which is very troublesome in view of the considerable efforts put forth to create beautiful displays.

In another system of the prior art (for example, EP 2 026 275 A1 and EP 1 587 014 A1), it has been proposed to print on the displays themselves an optical code that is recognizable by dedicated software. The consumer interested by the product presented on the display uses, for example, his mobile telephone in photo mode to capture the optical code of the display. To search for additional information, the consumer is connected to a server either in an indirect way or in a direct way by use of a URL associated with the product that is the object of the display and thus to access additional information on this product.

However, this method exhibits the drawback that the optical code that is added does not necessarily correspond to the graph chart used in the display and thus can compromise its aesthetic integrity. Also, since the display placed on different panels is always the same, it is impossible to identify the panel on which the consumer has seen the display when he retrieves the corresponding additional information.

Also, to access the additional information, the consumer must take a photo of the optical code with a mobile telephone equipped with a photo device, transmit this image by MMS to a remote server that recognizes the code, a server that resends the corresponding URL by SMS to the user. Using the browser of his mobile telephone, the consumer can ultimately download and consult the additional information from the URL received in the SMS message.

In another proposed method, the consumer downloads an application, installs it on his mobile telephone, and then he launches this application that, by the photo mode of his mobile telephone, retrieves the image of the optical code and then analyzes it. This analysis reveals the URL either directly if it is encoded by the optical code, or by a remote server to which the application is connected by the mobile telephone network. The server sends back to the application the URL corresponding to the data item encoded by the optical code. The application can then open the browser of the mobile telephone that will then download the additional information from the URL received.

In another proposed method, the additional information is sent to the consumer on his mobile telephone by the advertising display panel equipped with a radio transmitter that detects and establishes the communication with the mobile telephones equipped with a radio link, Bluetooth or Wi-Fi, for example. However, each panel needs a considerable storage capacity to store all of the additional information. Also, each display panel should store personalized data of said panel.

Consequently, it is necessary to update each panel with different data. This method furthermore presents an intrusive troublesome character that can give rise to a violation of privacy since the downloading of the additional data can be done automatically when a mobile terminal is found in the vicinity of the display panel.

In another system of the prior art (for example, US 2002/0116268 A1), it is proposed to use an RFID-type label affixed to the advertising display to make it possible for a mobile terminal to retrieve the URL making it possible to access the additional information. This system exhibits the drawback that since all of the displays of a certain piece of information have the same RFID, it is not possible for the mobile terminal to have a piece of information on the display panel on which it is installed, which limits the additional information that can be provided.

To eliminate this drawback, it has also been proposed in the prior art (U.S. Pat. No. 6,549,625 B1) to provide a transmitter of electromagnetic waves (optical or radio, for example) in the vicinity of the panel and containing the positional information. A mobile terminal, located in the perimeter covered by the electromagnetic wave transmitter and equipped to be able to receive the electromagnetic signal, is able to retrieve this positional information and to transmit it to a central system that is able to identify the information displayed on the panel and therefore to send additional information back to the mobile terminal.

However, this system exhibits several serious drawbacks. Actually, said electromagnetic transmitter, which transmits electromagnetic waves, consumes power; if several panels are located at distances that are close to one another, there are risks of interference between these waves and a multiplication of risks of collision of the messages; finally, the mobile terminal entering the perimeter of coverage can be activated by said electromagnetic waves, which generates the electric power consumption in the mobile terminals, a very disturbing consumption because the life of a charge of the battery is a crucial parameter for the user of the mobile terminal.

In these different methods of the prior art, the process of accessing the additional information is detrimental to the esthetics of the display, to the freedom of the consumer, and to the life of the charge of the battery of the mobile terminal.

SUMMARY OF THE INVENTION

The invention in at least one embodiment has as its object to eliminate the different drawbacks of the state of the art and to provide improvements.

A first aspect of the invention proposes, for this purpose, a method for acquisition, by a mobile terminal located in the vicinity of a display panel, of additional information linked to at least one display present on the display panel, the method comprising the following steps: acquiring the identification data that make it possible to identify the display panel, transmitting the identification data to a processing service by means of a communication network; and receiving, from the processing service, the additional information related to the display presented on the display panel identified by the processing service from the identification data.

In an embodiment of the invention, the identification data can be retrieved directly from the display panel by establishing a wireless communication link between the mobile terminal and the display panel. In another embodiment, the identification data can be retrieved from the geographic data of the mobile terminal. In still another embodiment, the identification data can be retrieved from the display panel by means of an image capture or by data capture by means of the keyboard of the mobile terminal, for example.

A second aspect of the invention proposes a method of broadcasting to a mobile terminal additional information linked to at least one display present on a display panel, the method comprising the following steps: receiving from a mobile terminal, by means of a communication network, the identification data that make it possible to identify a display panel; identifying said display panel from the identification data; locating the display panel and identifying the display presented on the display panel; retrieving the additional data related to the display presented on the identified display panel; and transmitting the additional data to the mobile terminal.

Advantageously, the additional data can be related to the geographic location of said display panel.

Furthermore, the method can comprise a step for storing the identification data related to a plurality of display panels, and for each display panel, a step for storing the geographic positional data of the display panel and the identification data of the display present on the respective display panel making it possible to retrieve the corresponding additional information.

The method can further comprise a step of customizing the additional information from the identification data of the display panel and, if necessary, the geographic positional data of the display panel.

In an embodiment, the additional information can be updated when the display panel is modified or replaced.

A third aspect of the invention proposes a system for broadcasting the additional data linked to at least one display present on a display panel to a mobile terminal, the system comprising means for receiving, from a mobile terminal, using a communication network, identification data that make it possible to identify a display panel; means for identifying said display panel from the identification data; means for identifying the location of the display panel and the display present on the display panel; means for retrieving the additional information related to the display presented on the identified display panel; means for transmitting the additional information to the mobile terminal.

In an embodiment, the additional information can be related to the geographic location of said display panel.

In an embodiment, the broadcasting system can comprise an operations center comprising means for storing the identification data related to a plurality of display panels, as well as for each display panel, the geographic positional data of the display panel and the identification data of the display or displays presented on the respective display panel making it possible to retrieve the corresponding additional information; and a service center comprising means for storing the additional information and means for broadcasting the additional information to the mobile terminal, the operations center and the service center being interconnected by means of a communication network.

The data can be exchanged between the service center and the operations center by exchange of XML files, for example in the SOAP format.

A fourth aspect of the invention proposes a display panel comprising an identification element, identification data representative of the identification element being retrievable by a mobile terminal located in the vicinity of the panel and making it possible to identify the display panel, the geographic location of the display panel as well as the display or displays presented on the display panel.

The display panel can further comprise means for transmitting the data that are representative of the identification element to a mobile terminal by means of a wireless communication link.

A fifth aspect of the invention proposes a mobile terminal comprising: means for acquiring the identification data that make it possible to identify a display panel located in the vicinity of the mobile terminal, means for transmitting the identification data to a processing service by means of a communication network; and means for receiving, from the processing service, the additional information related to a display or to the displays presented on the display panel identified by the processing service from the identification data, and if necessary, related to the geographic location of said display panel.

Thus, a consumer located in front of a panel can obtain additional information about the product or services presented on this panel quickly and simply.

In an embodiment, the identification data once captured by the mobile terminal can be stored in the terminal.

Each aspect of this invention proposes a computer program for using at least one part of the corresponding method described above. Such a program can be downloadable via a telecommunication network and/or stored in a memory of a processing device and/or stored on a storage medium intended to work with a processing device.

DESCRIPTION OF THE FIGURES

Other characteristics and advantages of the invention will appear on reading the detailed description below of an example of embodiment by way of nonlimiting illustration, and made with reference to the accompanying drawings in which.

DETAILED DESCRIPTION

Figure 1:
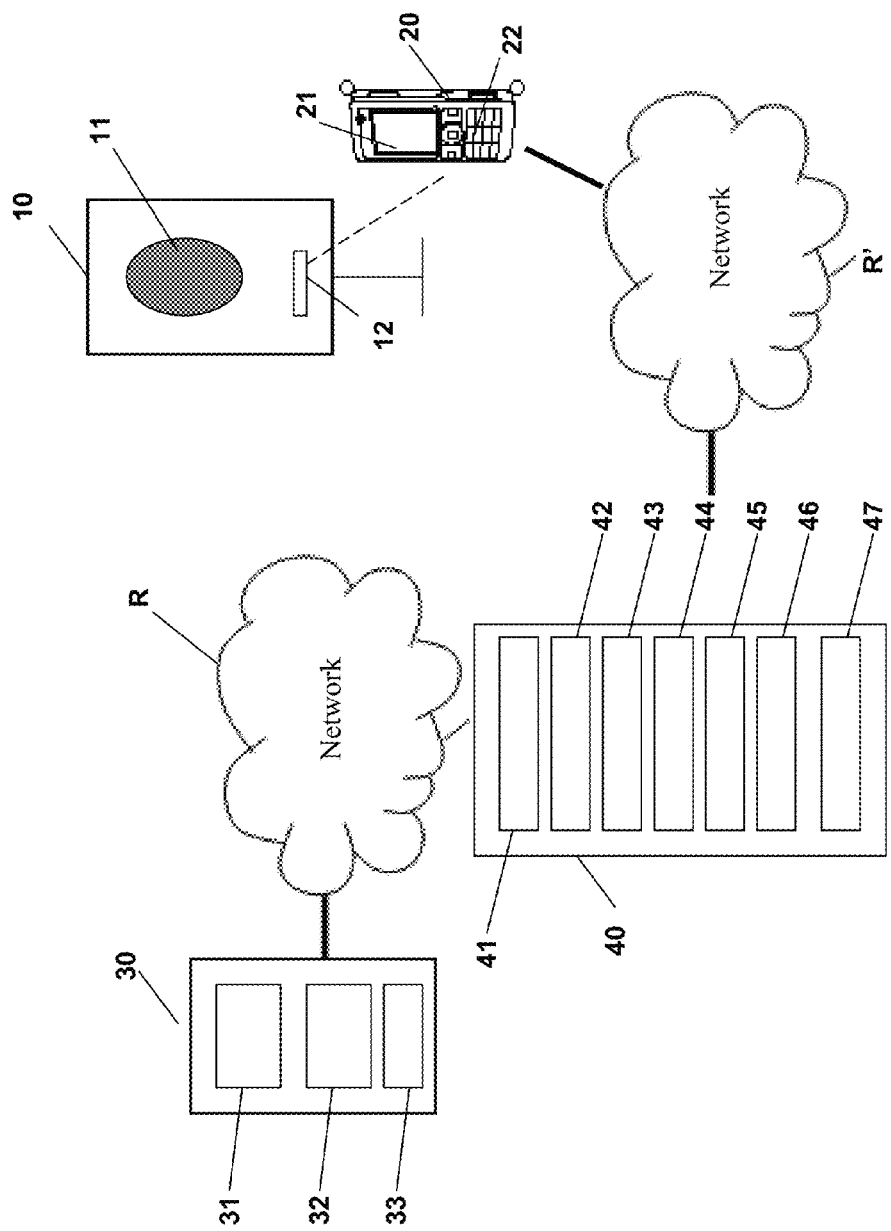
FIG. 1 diagrammatically illustrates a system for obtaining additional information linked to a display present on a display panel according to at least one embodiment of the invention.

FIG. 1 diagrammatically illustrates a system according to a first embodiment of the invention that makes it possible for a mobile terminal to obtain additional information linked to a display present on an advertising display panel. The modules shown in the figure are functional units, which may or may not correspond to physically distinguishable units. For example, these modules, or some of them, can be regrouped into a single component, or constitute functions of the same software. A contrario, some modules can possibly be composed of separate physical entities.

The system comprises a display panel 10 to which is fastened a display 11 that presents a product or a service to consumers. The display panel 10 further comprises an identification element 12 that supplies to a mobile terminal 20 identification data that make it possible to identify the display panel 10.

The identification element 12 of the display panel 10 can be presented by any means that makes it possible for it to be seen directly by the consumer. It can be printed directly on the body of the panel 10, or displayed by a variable display screen using LCD technology, plasma, LEDs or electronic ink, for example. The identification element 12 can be presented in the form of a code, an image, or text, for example.

In this embodiment, the data that are representative of the identification element 12 are a photograph of the identification element 12.

The system further comprises an operations center 30 in which storage means 31 are provided, these storage means 31 containing data that are representative of the different identification elements 12 of the panels 10 as well as the geographic position of each panel 10 and the identifier of the display or the displays presented on the associated panel 10. The operator of the display panels is responsible for updating the storage means of the operations center 30 when display panels are added, display panels are removed or display panels are modified.

The operations center 30 is linked by a network R such as a private Internet network, for example, to at least one service center 40 in which means for storage and broadcasting of the additional information related to the display of the display panel 10 are provided.

The operations center 30 further comprises automatic means for receiving 32 identification elements 12 of the panels 10 and automatic means for sending 33 the identifier of the display or of the displays 11 presented on the display panel 10 and of the geographic position of the display panel 10 from the identification element 12.

The service center 40 comprises:
automatic means 42 for receiving data, representative of the identification element 12, transmitted by the mobile terminal 20, and processing means 43 to extract the identification element from the representative data received,
automatic means for sending 44 the extracted identification elements to the operations center 30,
automatic means for sending 45 the additional information to the mobile terminal 20,
automatic means for receiving 46 the identifier of the display or of the displays and the geographic position of a display panel 10,
means for customizing 47 the additional information from the identifier of the display or displays 11 and the geographic position received by the receiving means.

The storage means of the service center 40 or of the operations center 30 can be a server containing a database that incorporates the information described. The server can implement a service for interrogating this database using a "Web Service." Advantageously, it will be possible to use the WXML language to describe this service, which will be implemented by exchanging XML files in the SOAP format between the service center 40 and the operations center 30.

The mobile terminal 20 can be a portable telephone, a PDA, a portable computer, etc., comprising means for capturing information such as a keyboard 21 or a tactile interface of a screen 22 and calculating means, and means for sending and receiving data, in particular for sending data that are representative of the identification element, by the connection to a public telecommunication network R' such as a 3G GSM network, for example. The mobile terminal 20 is designed to receive and to show the additional information on the screen 22 from the data received from the service center or service centers 40.

Figure 2:
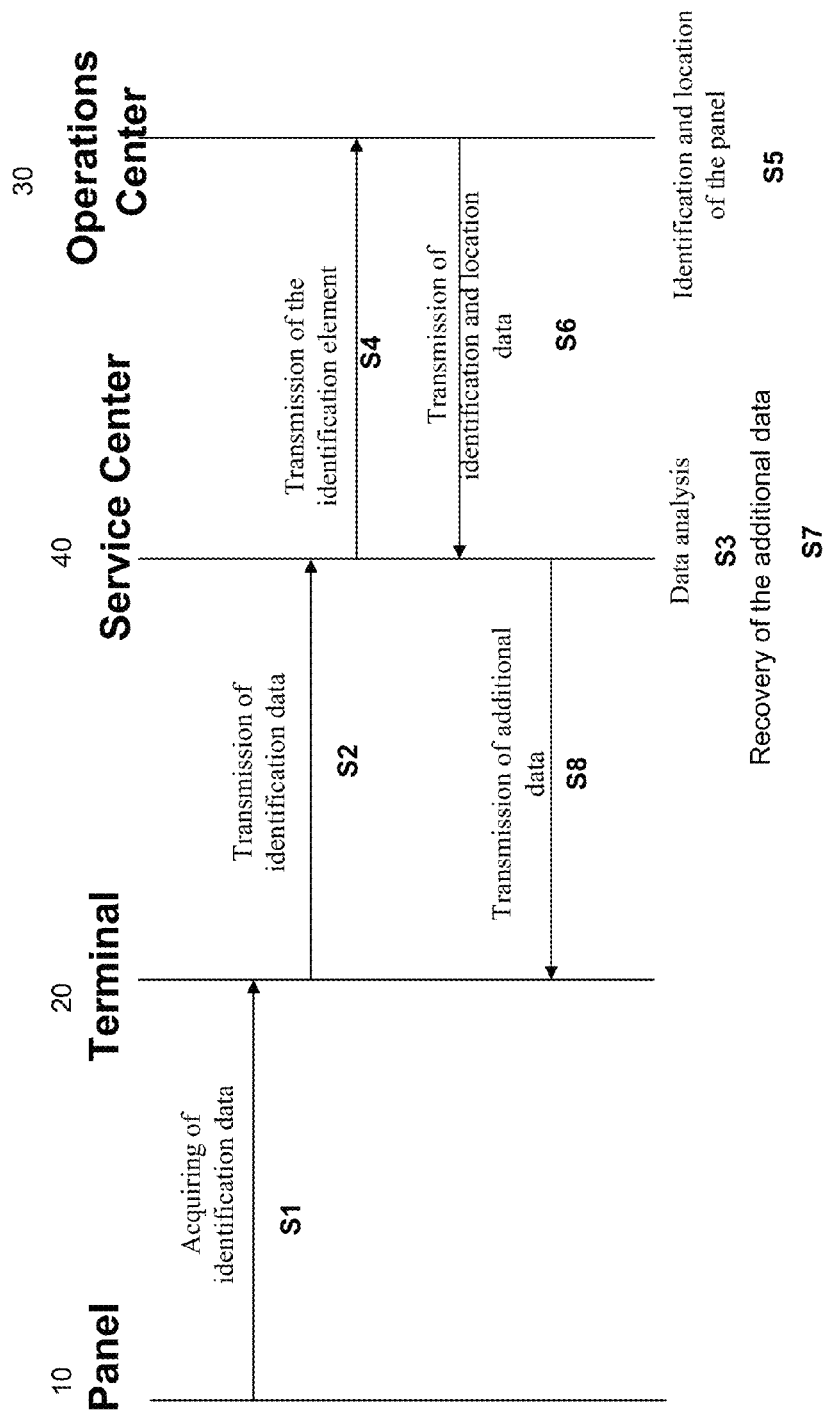
FIG. 2 illustrates the steps of a method for acquiring the additional information linked to a display present on a display panel according to at least one embodiment of the invention.

Reference is now made to FIG. 2 in which the exchanges of data between the different entities of the system illustrated in FIG. 1 are illustrated to communicate additional information to a user of the mobile terminal 20 about a product or services presented on a display 11 placed in a display panel 10 according to the first embodiment of the invention.

The user of the terminal 20 passes in front of the display panel 10 on which the display 11 is presented. The display 11 presents information about a product in which the user is interested and on the subject of which he wishes to have additional information, such as, for example, the price of the product, the nearby stores that sell this product, etc. In a first step of the method, the user of the mobile terminal 20 places himself in the vicinity of the display panel 10 to retrieve identification data that make it possible to identify the display panel 10.

During a step S1 of acquiring identification data, the identification data representative of the identification element 12 of the display panel 10 are retrieved from the display panel 10 in the form of a photograph of the identification element 12 by means of an image capture.

It is possible, in a variant, to have in the mobile terminal a memory so as to keep the identification data there once captured by the mobile terminal, so that the user can transmit the identification data to the operations center so as to access the additional information, even if he is far from the display panel, for example if he was moving while passing in front of the display panel.

A step S2 follows of transmission of identification data from the mobile terminal 20 directly to the service center 40 by a public telecommunication network R'. After receiving the identification data, in a data analysis step S3, the representative data are processed so as to extract from them the identification element 12 of the display panel 10. Then, in a step S4, the extracted identification element 12 is sent from the service center 40 to the operations center 30.

Of course, in a variant, the analysis of the representative data for extracting the identification element from them can take place in the operations center 30.

In a step S5, the operations center 30 uses the identification element 12 to identify the display panel 10 and to obtain geographic coordinates of the display panel 10.

During a step S6, the operations center 30 transmits to the service center 40 the identifier of the display 11 (or of the displays) of the display panel that corresponds to the identification element 12 and the geographic coordinates of the display panel 10 that correspond to the identification element 12.

In a step S7, the service center 40 retrieves additional data related to the display 11 presented on the identified display panel 10 and related to the geographic location of the display panel.

A step S8 follows of dialogue between the mobile terminal 20 and the service center 40 that supplies to the consumer additional information about the product or services presented on the identified display 11, as well as information specific to the geographic location of the display panel 10.

The consumer can use the mobile terminal 20 to receive the additional information by Internet network. To link up with the Internet network, a Wi-Fi technology optionally incorporated in the mobile terminal can be used if an access point is within its range, or a 3G modem incorporated in the mobile terminal or incorporated in a USB key connected to the mobile terminal.

The service center can be implemented using a web server. If the identification element 12 of the panel 10 is Y, the display panel 10 can incorporate a comment of the type "To learn more about it, go to http://www.abcdef.com/Y." The site www.abcdef.com can right away contain the specific information or perform an automatic redirection to a site containing the information specific to the product or service advertised on the display 11, while transmitting the geographic coordinates of the identified panel 10.

Embodiments of the invention relate to a method and a device supplying a consultation service of additional information to a consumer located in front of a display panel making it possible for him to obtain quickly and simply additional information about the product or services presented on this panel.

In short, when the consumer accesses the service center 40 by a public network R', the display panel 10 on which he has seen a display 11 is identified. The service center 40 can interrogate the operations center 30 and retrieve the geographic location of the display panel (and therefore of the consumer) as well as the display present on the display panel thanks to the identification element of the display panel and to the information stored in the storage means of the operations center. Thus, the information presented to the consumer is consistent with the display viewed as well as its geographic location.

Of course, the invention is not limited to the examples of embodiment represented and described above, from which other designs and other forms of embodiment will be able to be foreseen, without thereby going outside of the scope of the invention.

In variants, for example, the identification element will be able to be deduced from the geolocation of the mobile terminal 10. In this case, the geolocational data obtained, for example by means of a geolocational module installed on the terminal, can be transmitted from the mobile terminal 20 to the service center 40.

In other variants, the service center or service centers 40 and the operations center 30 can, in certain cases, constitute a one and only center and or a sole server. In this case, the broadcasting and receiving means from one center to the other and vice versa are not necessary, and the service center has access directly to the location and display data of the panels.

In other variants, the network R, which makes the link between the operations center and the service center, can be the same network R', which makes the link between the mobile terminal and the service center. This network can be an Internet network, for example.

In some embodiments, data representative of the identification element that make it possible to extract the identification element can be processed so as to extract the identification element either at the level of the portable electronic device, or at the level of the service center or centers, or at the level of the operations center.

In variants of the invention, the data representative of the identification element can be a string of characters entered by the user on the keyboard of his portable telephone or of his computer. In other embodiments, identification data of the panel can be transmitted from the panel to the terminal by a wireless link, such as a radio link or an infrared link, for example.

In some embodiments, the identification element of the panel can comprise a short narrative indicating to the consumer the process of accessing the information related to the display. If the service is based on the video telephony on the 3G networks, the consumer will use his 3G mobile telephone to receive the additional information. If the telephone number of the service is X and the identifier of the panel is Y, the identification element of the display panel can consist of the comment "For more information, call X in Visio and type Y." Since the number X is the same for all of the panels, a short number with four digits, for example, will be able to be used advantageously for X to speed up the access to the service.

The invention claimed is:

1. A method for acquiring by a mobile terminal, located in a vicinity of a display panel, additional information linked to at least one display present on the display panel, the method comprising the following steps:
   acquiring of identification data allowing identification of the display panel, transmitting, via a communication network, the identification data to a processing service; and
   receiving from the communication network, the additional information related to the display presented on the display panel identified by the processing service from the identification data and sent by the processing service on the communication network such that the mobile terminal send the identification data and receives the additional information over the same communication network.

2. The method according to claim 1, wherein the additional information is dependent on a geographic location of said display panel.

3. The method according to claim 1, wherein the identification data are retrieved from an identification element of the display panel.

4. The method according to claim 1, wherein the identification data are retrieved from geographic data of the mobile terminal.

5. The method according to claim 1, wherein the identification data are retrieved from the display panel by information capture by use of a keyboard of the mobile terminal.

6. The method according to claim 3, wherein the identification data from the identification element, are retrieved directly from the display panel by establishing a wireless communication link between the mobile terminal and the display panel.

7. The method according to claim 3, wherein the identification data are retrieved from the display panel by an image capture of said identification element of said display panel.

8. A method of broadcasting to a mobile terminal of additional information linked to at least one display present on a display panel, the method comprising the following steps:
   receiving from a mobile terminal, over a communication network, identification data allowing identification of a display panel;
   identifying and locating said display panel from the identification data;
   identifying the display presented on the display panel;
   retrieving the additional information related to the display presented on the identified display panel; and
   transmitting of the additional information to the mobile terminal over said communication network such that the mobile terminal sends the identification data and receives the additional information over the same communication network.

9. The method according to claim 8, further comprising a step for storing the identification data related to a plurality of display panels, and for each display panel, a step for storing the geographic positional data of the display panel, and the identification data of the display present on the respective display panel making it possible to retrieve the corresponding additional information.

10. The method according to claim 8, further comprising a step of customizing the additional information from the identification data of the display panel and, if necessary, the geographic positional data of the display panel.

11. The method according to claim 8, wherein the additional information is updated when the display of the panel is modified or replaced.

12. A broadcasting system for broadcasting additional data linked to at least one display present on a display panel to a mobile terminal, the system comprising:
  means for receiving, from a mobile terminal, using a communication network, identification data allowing identification of a display panel;
  means for identifying said display panel and a location of said display panel from the identification data, and for identifying the display present on the display panel from the identified location of said display panel;
  means for retrieving the additional information related to the display presented on the identified display panel;
  means for transmitting the additional information to the mobile terminal over said communication network so that said mobile terminal receives said additional information from said communication network.

13. The broadcasting system according to claim 12 further comprising:
  an operations center comprising means for storing the identification data related to a plurality of display panels, as well as for each display panel, the geographic positional data of the display panel and the identification data of the display or displays presented on the respective display panel that make it possible to retrieve the corresponding additional information;
  a service center comprising means for storing the additional information and means for broadcasting the additional information to the mobile terminal; and
  the operations center and the service center being interconnected by means of said communication network.

14. The broadcasting system according to claim 13, wherein the data are exchanged between the service center and the operations center by exchange of XML files.

15. The broadcasting system of claim 12 in combination with a display panel comprising an identification element, identification data representative of the identification element that are retrievable by a mobile terminal located in the vicinity of the panel and allowing identification of the display panel, the geographic location of the display panel as well as the display or displays presented on the display panel.

16. The combination of claim 15, where display panel further comprises means for transmitting the data that are representative of the identification element to a mobile terminal by means of a wireless communication link.

17. The combination of claim 16 in further combination with the mobile terminal, the mobile terminal comprising:
  means for acquiring the identification data allowing the identification of the display panel located in the vicinity of the mobile terminal,
  means for transmitting, via the communication network, the identification data to the processing service; and
  means for receiving, from the processing service and via the communication network, the additional information related to a display or to the displays presented on the display panel identified by the processing service from the identification data, and if necessary, related to the geographic location of said display panel.

18. A non-transitory computer readable storage medium having thereon a computer program, that when executed on a computer, causes the computer to execute the method according to claim 1.

19. A method of broadcasting additional information linked to at least one display present on a display panel to a mobile terminal, the method comprising the steps of:
  receiving identification data allowing identification of the display panel having the at least one display present, the identification data being sent from the mobile terminal over a communication network;
  identifying said display panel from the received identification data;
  locating the display panel and identifying the display presented on the display panel;
  retrieving the additional information related to the display presented on the identified display panel;
  transmitting of the additional information to the mobile terminal; and
  storing the identification data related to a plurality of display panels, wherein for each respective display panel of said plurality of display panels, geographic positional data is stored and the identification data of the display present on each respective display panel allows retrieval of the corresponding additional information.

* * * * *